United States Patent
Li et al.

(10) Patent No.: US 11,169,276 B2
(45) Date of Patent: Nov. 9, 2021

(54) SATELLITE SIGNAL RECEIVING CIRCUIT AND SATELLITE SIGNAL RECEIVING METHOD

(71) Applicant: REALTEK SEMICONDUCTOR CORPORATION, Hsinchu (TW)

(72) Inventors: Chin-Lung Li, Taoyuan (TW); Ka-Un Chan, Hsinchu County (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 433 days.

(21) Appl. No.: 16/265,119

(22) Filed: Feb. 1, 2019

(65) Prior Publication Data
US 2019/0250281 A1 Aug. 15, 2019

(30) Foreign Application Priority Data
Feb. 13, 2018 (TW) .................. 107105198

(51) Int. Cl.
*G01S 19/33* (2010.01)
*G01S 19/39* (2010.01)
*G01S 19/36* (2010.01)

(52) U.S. Cl.
CPC .............. *G01S 19/33* (2013.01); *G01S 19/36* (2013.01); *G01S 19/39* (2013.01)

(58) Field of Classification Search
CPC ........... G01S 19/33; G01S 19/36; G01S 19/39
See application file for complete search history.

(56) References Cited

U.S. PATENT DOCUMENTS 5,016,257 A * 5/1991 Wolf ...................... G01S 19/24
342/357.63
7,551,127 B2 6/2009 Dubash et al.
(Continued)

FOREIGN PATENT DOCUMENTS

CN 101198160 A 6/2008
CN 104297768 A 1/2015
(Continued)

OTHER PUBLICATIONS

OA letter of the counterpart CN application (appl. No. 201810162465.5) mailed on Sep. 24, 2020. Summary of the OA letter: Claims 1-10 are rejected under Patent Law Article 22(3) as being unpatentable over reference 1 (CN104297768A), 2 (CN101198160A) and 3 (CN104749591A).

(Continued)

*Primary Examiner* — Dao L Phan
(74) *Attorney, Agent, or Firm* — WPAT, PC (57) ABSTRACT

A satellite signal receiving circuit includes an oscillator, two mixers, two phase shifters, two low-pass filters, two phase operation circuits, and a bandpass filter. When the frequency of the oscillator is between the center frequencies of the Global Orbiting Navigation Satellite System (GLONASS) and the GPS or the Galileo system, the GLONASS and GPS/Galileo satellite baseband signals are obtained through phase addition and subtraction performed by the phase operation circuits, while the BeiDou Navigation Satellite System (BDS) baseband signal is obtained through the bandpass filter. When the frequency of the oscillator is between the center frequencies of the BDS and the GPS or the Galileo system, the BDS and GPS/Galileo satellite baseband signals are obtained through phase addition and subtraction performed by the phase operation circuits, while (Continued)

the GLONASS satellite baseband signal is obtained through the bandpass filter.

14 Claims, 5 Drawing Sheets

(56) References Cited

U.S. PATENT DOCUMENTS

| | | |
|---|---|---|
| 9,766,347 B2 | 9/2017 | Grasso et al. |
| 2002/0173337 A1* | 11/2002 | Hajimiri ............... H04B 1/005 455/552.1 |
| 2003/0145328 A1* | 7/2003 | Rabinowitz ............ G01S 19/36 725/72 |
| 2009/0124221 A1 | 5/2009 | Cho et al. |
| 2010/0097966 A1 | 4/2010 | Chen |

FOREIGN PATENT DOCUMENTS

| | | |
|---|---|---|
| CN | 104749591 A | 7/2015 |
| CN | 205091466 U | 3/2016 |

OTHER PUBLICATIONS

OA letter of counterpart TW application of application No. 107105198 mailed on May 21, 2018. Summary of the OA letter: Reference 1 (CN101198160A) and Reference 2 (CN205091466U) rendered claims 1-3, 8-10 obvious.

* cited by examiner

SATELLITE SIGNAL RECEIVING CIRCUIT AND SATELLITE SIGNAL RECEIVING METHOD

BACKGROUND OF THE INVENTION

1. Field of the Invention

The present invention generally relates to the Global Navigation Satellite System (GNSS), and, more particularly, to satellite signal reception for the GNSS.

2. Description of Related Art

Figure 1:
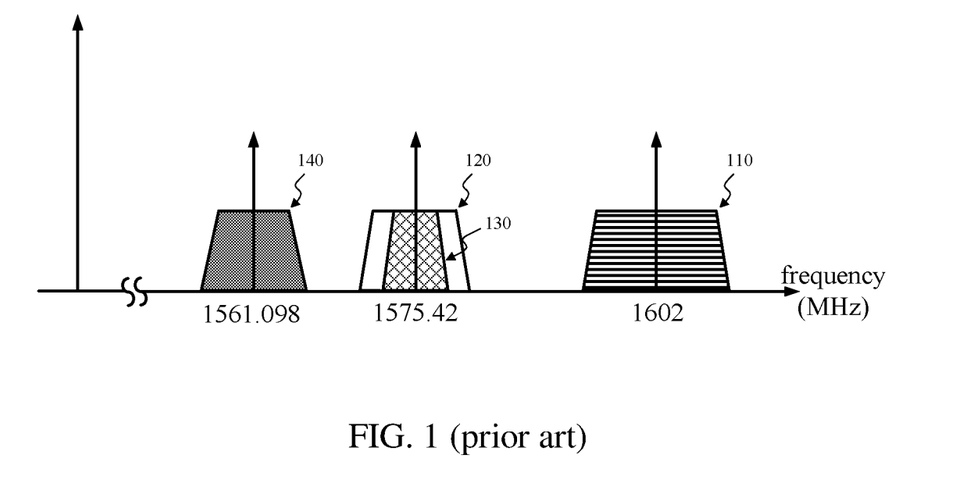
FIG. 1 illustrates the frequency bands used by several satellite systems.

The Global Navigation Satellite System (GNSS) technology is widely used nowadays. FIG. 1 shows the frequency bands used by several satellite systems. The frequency band 110 corresponds to the Soviet Union's Global Orbiting Navigation Satellite System (GLONASS) having a center frequency of 1602 MHz, the frequency band 120 corresponds to the European Union's Galileo having a center frequency of 1575.42 MHz, the frequency band 130 corresponds to the US Global Positioning System (GPS) having a center frequency of 1575.42 MHz, and the frequency band 140 corresponds to China's BeiDou Navigation Satellite System (BDS) having a center frequency of 1561.098 MHz. A number of patents or patent applications that made attempts to increase the positioning speed and positioning accuracy of a satellite navigation receiver has been proposed, such as U.S. Patent Publication Nos. US20090124221 and US20100097966, and U.S. Pat. No. 7,551,127. The U.S. Patent Publication No. US20090124221 utilizes two sets of receivers and two sets of frequency synthesizers to achieve double band reception (i.e., simultaneously receiving satellite signals of two different center frequencies). However, using two sets of receivers simultaneously doubles the power consumption. The U.S. Patent Publication No. US20100097966 implements double band reception by sharing a low noise amplifier and using a frequency synthesizer to output two types of oscillation signals to two down-conversion receiving paths, respectively. The U.S. Pat. No. 7,551,127 utilizes a reconfigurable frequency divider to achieve double band reception. One of the disadvantages of the above-mentioned double band receivers is that it can only receive satellite signals of two frequency bands, which limits the positioning speed and positioning accuracy of the satellite navigation receiver.

SUMMARY OF THE INVENTION

In view of the issues of the prior art, an object of the present invention is to provide a satellite signal receiving circuit and a satellite signal receiving method capable of simultaneously receiving three frequency bands, so as to make an improvement to the prior art.

A satellite signal receiving circuit is provided. The satellite signal receiving circuit is configured to receive a satellite signal and includes an oscillator, a first mixer, a first phase shifter, a second mixer, a first low-pass filter, a second low-pass filter, a second phase shifter, a first phase operation circuit, a second phase operation circuit, and a bandpass filter. The oscillator is configured to generate a first reference signal. The first mixer is coupled to the oscillator and configured to mix the first reference signal with the satellite signal to generate a first mixed signal. The first phase shifter is coupled to the oscillator and configured to adjust a phase of the first reference signal to generate a second reference signal, the first reference signal and the second reference signal being in quadrature. The second mixer is coupled to the first phase shifter and configured to mix the second reference signal with the satellite signal to generate a second mixed signal. The first low-pass filter is coupled to the first mixer and configured to filter the first mixed signal to obtain a first filtered signal. The second low-pass filter is coupled to the second mixer and configured to filter the second mixed signal to obtain a second filtered signal. The second phase shifter is coupled to the second low-pass filter and configured to adjust a phase of the second filtered signal to generate a phase-shifted signal. The first phase operation circuit is coupled to the first low-pass filter and the second phase shifter and configured to perform operations on the first filtered signal and the phase-shifted signal to generate a first satellite baseband signal. The second phase operation circuit is coupled to the first low-pass filter and the second phase shifter and configured to perform operations on the first filtered signal and the phase-shifted signal to generate a second satellite baseband signal. The bandpass filter is coupled to the first mixer and the second mixer and configured to filter the first mixed signal and the second mixed signal to obtain a third satellite baseband signal.

A satellite signal receiving method is also provided. The method includes the steps of: (a) receiving a satellite signal; (b) providing a first reference signal; (c) mixing the first reference signal and the satellite signal to obtain an in-phase component of the satellite signal; (d) providing a second reference signal, the first reference signal and the second reference signal being in quadrature; (e) mixing the second reference signal and the satellite signal to obtain a quadrature component of the satellite signal; (f) low-pass filtering the in-phase component of the satellite signal and the quadrature component of the satellite signal; (g) phase-shifting the low-pass filtered quadrature component of the satellite signal to generate a phase-shifted quadrature component; (h) calculating a sum of the phase-shifted quadrature component and the low-pass filtered in-phase component of the satellite signal to obtain a first satellite baseband signal; (i) calculating a difference between the phase-shifted quadrature component and the low-pass filtered in-phase component of the satellite signal to obtain a second satellite baseband signal; and (j) bandpass filtering the in-phase component of the satellite signal and the quadrature component of the satellite signal to obtain a third satellite baseband signal.

The invention utilizes one voltage-controlled oscillator (VCO) to realize triple band reception of satellite signals. Compared with the prior art, the satellite signal receiving circuit and the receiving method of this invention can not only improve the positioning speed and positioning accuracy of the satellite navigation receiver, but also achieve the efficacy of saving power and reducing circuit area.

These and other objectives of the present invention no doubt become obvious to those of ordinary skill in the art after reading the following detailed description of the preferred embodiments with reference to the various figures and drawings.

DETAILED DESCRIPTION OF THE EMBODIMENTS

The following description is written by referring to terms of this technical field. If any term is defined in this specification, such term should be explained accordingly. In addition, the connection between objects or events in the below-described embodiments can be direct or indirect provided that these embodiments are practicable under such connection. Said "indirect" means that an intermediate object or a physical space exists between the objects, or an intermediate event or a time interval exists between the events.

The disclosure herein includes a satellite signal receiving circuit and a satellite signal receiving method. On account of that some or all elements of the satellite signal receiving circuit could be known, the detail of such elements is omitted provided that such detail has little to do with the features of this disclosure and this omission nowhere dissatisfies the specification and enablement requirements. Some or all of the processes of the satellite signal receiving method may be implemented by software and/or firmware and can be performed by the satellite signal receiving circuit or its equivalent. A person having ordinary skill in the art can choose components or steps equivalent to those described in this specification to carry out the present invention, which means that the scope of this invention is not limited to the embodiments in the specification.

Figure 2:
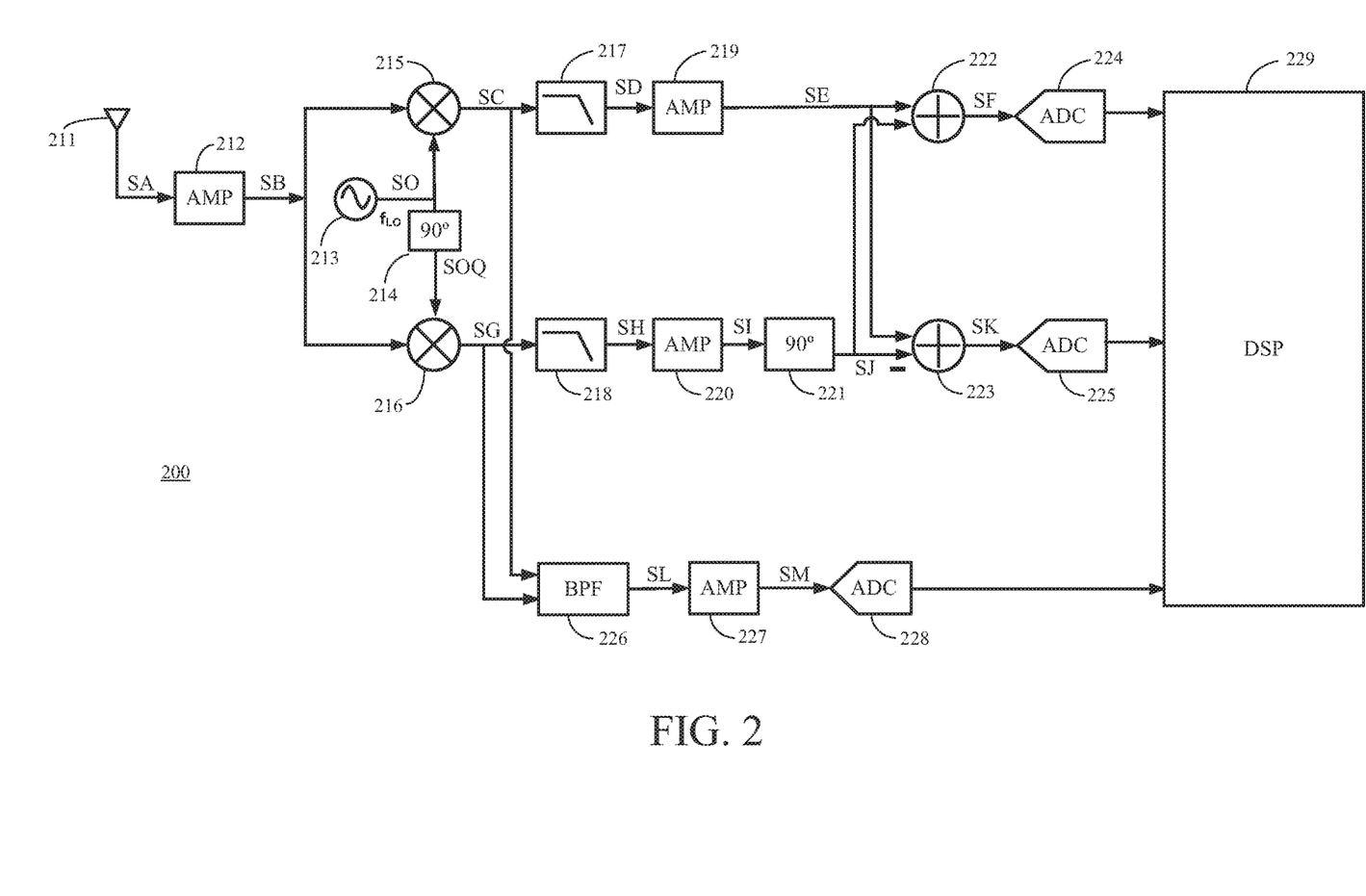
FIG. 2 illustrates a functional block diagram of a satellite signal receiving circuit according to an embodiment of the present invention.
Figure 3A:
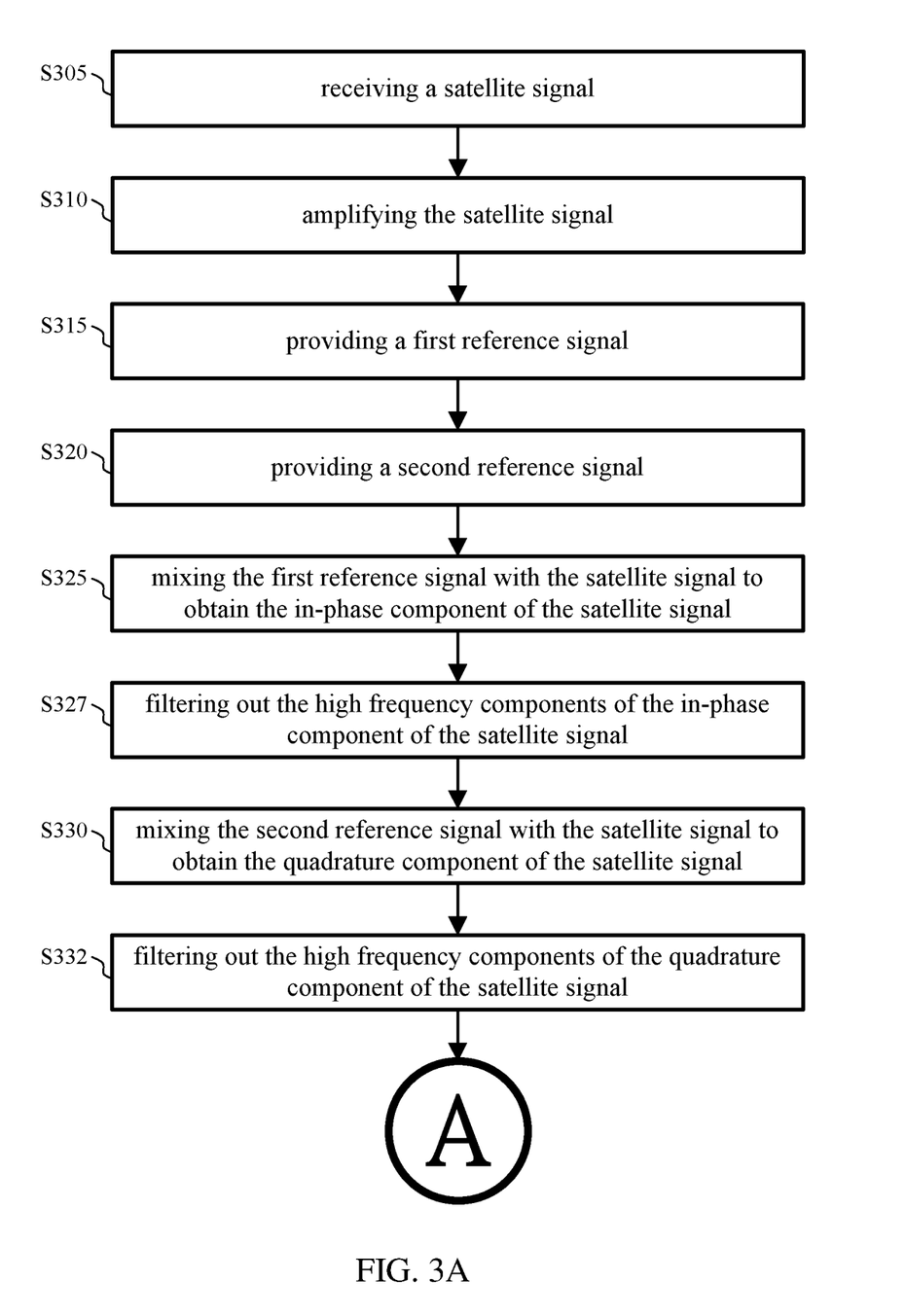
FIGS. 3A-3B illustrate flowcharts of a satellite signal receiving method according to an embodiment of the present invention.
Figure 3B:
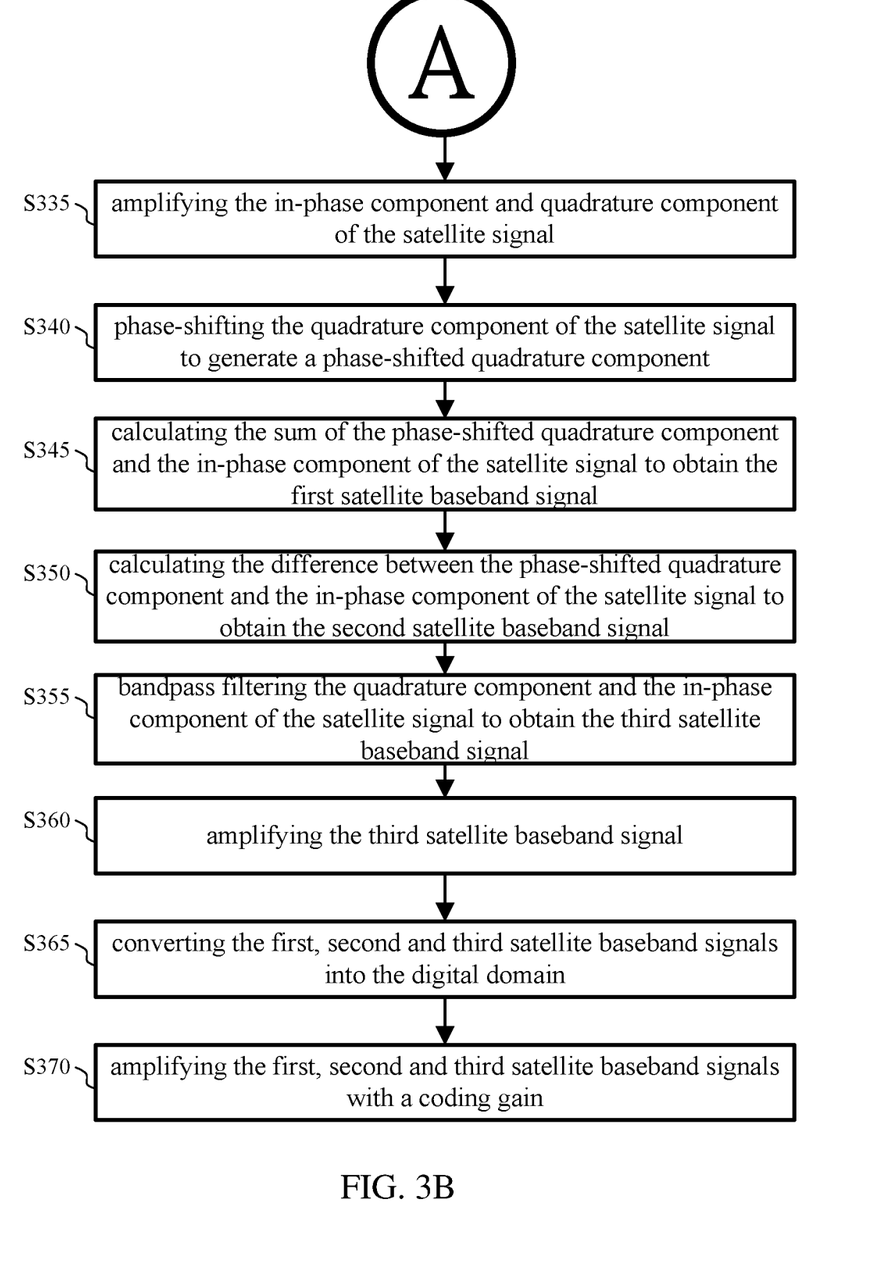

FIG. 2 is a functional block diagram of a satellite signal receiving circuit according to an embodiment of the present invention, and FIGS. 3A and 3B are flowcharts of a satellite signal receiving method according to an embodiment of the present invention. The details of the operations of the present invention are described below with reference to FIGS. 2, 3A and 3B. The satellite signal receiving circuit 200 receives the satellite signal SA through the antenna 211 (step S305) and then utilizes an amplifier 212 (e.g., a low-noise amplifier (LNA)) to amplify the satellite signal SA to thereby generate a satellite signal SB (Step S310). The satellite signal SA and the satellite signal SB can be expressed by expressions (1) and (2), respectively:

$$SA = A_{RF1} \cos \omega_{RF1}t + A_{RF2} \cos \omega_{RF2}t + A_{RF3} \cos \omega_{RF3}t \quad (1)$$

$$SB = G_1(A_{RF1} \cos \omega_{RF1}t + A_{RF2} \cos \omega_{RF2}t + A_{RF3} \cos \omega_{RF3}t) \quad (2)$$

where $\omega_{RF1}$, $\omega_{RF2}$ and $\omega_{RF3}$ are angular frequencies of the frequency band 110, the frequency band 120 (or 130), and the frequency band 140, respectively. That is, $\omega_{RF1}=2\pi\times 1602\times 10^6$, $\omega_{RF2}=2\pi\times 1575.42\times 10^6$ and $\omega_{RF3}=2\pi\times 1561.098\times 10^6$. $A_{RF1}$, $A_{RF2}$ and $A_{RF3}$ are amplitudes of the frequency band 110, the frequency band 120 (or 130), and the frequency band 140, respectively. $G_1$ is the gain of the amplifier 212.

Then, a first reference signal and a second reference signal are provided, and the first reference signal and the second reference signal are in quadrature (steps S315, S320). For example, in this embodiment, the VCO 213 provides a first reference signal SO of frequency $f_{LO}$ (step S315), and a second reference signal SOQ is generated after the phase of the first reference signal SO is adjusted by 90° by the 90° phase shifter 214 (step S320). The first reference signal SO and the second reference signal SOQ can be expressed by expressions (3) and (4), respectively:

$$SO = \cos \omega_{LO} t \quad (3)$$

$$SOQ = \sin \omega_{LO} t \quad (4)$$

where $\omega_{LO}=2\pi f_{LO}$. In other embodiments, the first reference signal SO and the second reference signal SOQ can be provided by separate VCOs 213, respectively. However, the circuit using one VCO is more power saving than the circuit using two VCOs and can avoid the problem of frequency pulling between the two oscillators.

The frequency $f_{LO}$ may be set between the center frequency of the frequency band 120 (or 130) and the center frequency of the frequency band 110, or between the center frequency of the frequency band 120 (or 130) and the center frequency of the frequency band 140. Next, the present invention will be described in detail by an example of setting the frequency $f_{LO}$ of the first reference signal SO to be between the center frequency of the frequency band 120 (or 130) and the center frequency of the frequency band 110 (i.e., $\omega_{RF2}<\omega_{LO}<\omega_{RF1}$).

Next, the first reference signal SO and the satellite signal SB are first mixed and then low-pass filtered to thereby generate an in-phase component of the down-converted satellite signal (steps S325, S327). More specifically, in the embodiment of FIG. 2, the satellite signal receiving circuit 200 utilizes the mixer 215 and the low-pass filter (LPF) 217 to implement these two steps. The mixer 215 mixes the satellite signal SB with the first reference signal SO to obtain the mixed signal SC, and then the LPF 217 low-pass filters the mixed signal SC to obtain the filtered signal SD. The mixed signal SC and the filtered signal SD can be expressed by expressions (5) and (6), respectively:

$$SC = G_1(A_{RF1} \cos \omega_{RF1}t + A_{RF2} \cos \omega_{RF2}t + A_{RF3} \cos \omega_{RF3}t) \cdot \cos \omega_{LO}t \quad (5)$$
$$= G_1 \Big\{ \frac{A_{RF1}}{2}[\cos(\omega_{LO}-\omega_{RF1})t - \cos(\omega_{LO}+\omega_{RF1})t] +$$
$$\frac{A_{RF2}}{2}[\cos(\omega_{LO}-\omega_{RF2})t - \cos(\omega_{LO}+\omega_{RF2})t] +$$
$$\frac{A_{RF3}}{2}[\cos(\omega_{LO}-\omega_{RF3})t - \cos(\omega_{LO}+\omega_{RF3})t]\Big\}$$

$$SD = G_1\left[\frac{A_{RF1}}{2}\cos(\omega_{LO}-\omega_{RF1})t + \frac{A_{RF2}}{2}\cos(\omega_{LO}-\omega_{RF2})t\right] \quad (6)$$

It can be known from expressions (5) and (6) that after the mixed signal SC is low-pass filtered, both the high-frequency component ($\cos(\omega_{LO}+\omega_{RF1})t$, $\cos(\omega_{LO}+\omega_{RF2})t$ and $\cos(\omega_{LO}+\omega_{RF3})t$) and the higher-frequency component ($\cos(\omega_{LO}-\omega_{RF3})t$) are filtered out.

Similar to steps S325 and S327, the second reference signal SOQ and the satellite signal SB are first mixed and then low-pass filtered to thereby generate a quadrature component of the down-converted satellite signal (steps S330, S332). More specifically, in the embodiment of FIG. 2, the satellite signal receiving circuit 200 utilizes the mixer 216 and the LPF 218 to implement these two steps. The mixer 216 mixes the satellite signal SB with the second reference signal SOQ to obtain the mixed signal SG, and then the LPF 218 low-pass filters the mixed signal SG to obtain the filtered signal SH. The mixed signal SG and the filtered signal SH can be expressed by expressions (7) and (8), respectively:

$$SG = G_1(A_{RF1} \cos \omega_{RF1}t + A_{RF2} \cos \omega_{RF2}t + \quad (7)$$
$$A_{RF3} \cos \omega_{RF3}t) \cdot \sin \omega_{LO}t$$
$$= G_1\left\{\frac{A_{RF1}}{2}[\sin(\omega_{LO}+\omega_{RF1})t + \sin(\omega_{LO}-\omega_{RF1})t] + \right.$$
$$\frac{A_{RF2}}{2}[\sin(\omega_{LO}+\omega_{RF2})t + \sin(\omega_{LO}-\omega_{RF2})t] +$$
$$\left.\frac{A_{RF3}}{2}[\sin(\omega_{LO}+\omega_{RF3})t + \sin(\omega_{LO}-\omega_{RF3})t]\right\}$$

$$SH = G_1\left[\frac{A_{RF1}}{2}\sin(\omega_{LO}-\omega_{RF1})t + \frac{A_{RF2}}{2}\sin(\omega_{LO}-\omega_{RF2})t\right] \quad (8)$$

Next, the in-phase component and the quadrature component of the satellite signal are amplified (step S335). More specifically, in the embodiment of FIG. 2, the filtered signal SD is amplified by the amplifier 219 (e.g., a programmable gain amplifier (PGA) having a gain of $G_2$) and thus becomes an amplified filtered signal SE. The filtered signal SH is amplified by the amplifier 220 (e.g., a PGA having a gain of $G_2$) and thus becomes an amplified filtered signal SI. The amplified filtered signal SE and the amplified filtered signal SI can be expressed by expressions (9) and (10), respectively:

$$SE = G_1 \cdot G_2\left[\frac{A_{RF1}}{2}\cos(\omega_{LO}-\omega_{RF1})t + \right. \quad (9)$$
$$\left.\frac{A_{RF2}}{2}\cos(\omega_{LO}-\omega_{RF2})t\right]$$
$$= G_1 \cdot G_2\left[\frac{A_{RF1}}{2}\cos(\omega_{RF1}-\omega_{LO})t + \right.$$
$$\left.\frac{A_{RF2}}{2}\cos(\omega_{LO}-\omega_{RF2})t\right]$$

$$SI = G_1 \cdot G_2\left[\frac{A_{RF1}}{2}\sin(\omega_{LO}-\omega_{RF1})t + \right. \quad (10)$$
$$\left.\frac{A_{RF2}}{2}\sin(\omega_{LO}-\omega_{RF2})t\right]$$
$$= G_1 \cdot G_2\left[-\frac{A_{RF1}}{2}\sin(\omega_{RF1}-\omega_{LO})t + \right.$$
$$\left.\frac{A_{RF2}}{2}\sin(\omega_{LO}-\omega_{RF2})t\right]$$

Next, the quadrature component of the satellite signal is phase shifted to generate a phase-shifted quadrature component (step S340). More specifically, the intermediate frequency (IF) 90° phase shifter 221 performs phase-shifting on the amplified filtered signal SI (e.g., phase-shifted by substantially 90°) to obtain a phase-shifted signal SJ, which can be expressed by expression (11):

$$SJ = G_1 \cdot G_2\left\{\frac{-A_{RF1}}{2}[\sin(\omega_{RF1}-\omega_{LO})t - 90°] + \right. \quad (11)$$
$$\left.\frac{A_{RF2}}{2}[\sin(\omega_{LO}-\omega_{RF2})t - 90°]\right\}$$
$$= G_1 \cdot G_2\left\{\frac{-A_{RF1}}{2}[\sin(\omega_{RF1}-\omega_{LO})t \cos 90° - \right.$$
$$\cos(\omega_{RF1}-\omega_{LO})t \sin 90°] +$$
$$\frac{A_{RF2}}{2}[\sin(\omega_{LO}-\omega_{RF2})t \cos 90° -$$
$$\left.\cos(\omega_{LO}-\omega_{RF2})t \sin 90°]\right\}$$
$$= G_1 \cdot G_2\left[\frac{A_{RF1}}{2}\cos(\omega_{RF1}-\omega_{LO})t - \right.$$

-continued
$$\left.\frac{A_{RF2}}{2}\cos(\omega_{LO}-\omega_{RF2})t\right]$$

Next, the sum of the phase-shifted quadrature component and the in-phase component of the satellite signal is calculated to obtain a first satellite baseband signal (step S345). More specifically, because $f_{LO}$ is set to be between the center frequency of the frequency band 120 (or 130) and the center frequency of the frequency band 110, the satellite signal of the Galileo system (or the GPS) is a mirror signal of the satellite signal of the GLONASS. The phase operation circuit 222 (e.g., a phase combiner) adds the amplified filtered signal SE and the phase-shifted signal SJ to obtain a satellite baseband signal SF, which can be expressed by expression (12):

$$SF = SE + SJ \quad (12)$$
$$= G_1 \cdot G_2 \cdot A_{RF1} \cos(\omega_{RF1}-\omega_{LO})t$$
$$= G_1 \cdot G_2 \cdot A_{RF1} \cos\omega_{IF1}t$$

where $\omega_{IF1}=\omega_{RF1}-\omega_{LO}$.

Similarly, the difference between the phase-shifted quadrature component and the in-phase component of the satellite signal is calculated to obtain a second satellite baseband signal (step S350). More specifically, because $f_{LO}$ is set to be between the center frequency of the frequency band 120 (or 130) and the center frequency of the frequency band 110, the satellite signal of the GLONASS is also a mirror signal of the satellite signal of the Galileo system (or the GPS). The phase operation circuit 223 (e.g., a phase combiner) subtracts the phase-shifted signal SJ from the amplified filtered signal SE to obtain a satellite baseband signal SK, which can be expressed by expression (13):

$$SK = SE - SJ \quad (13)$$
$$= G_1 \cdot G_2 \cdot A_{RF2} \cos(\omega_{LO}-\omega_{RF2})t$$
$$= G_1 \cdot G_2 \cdot A_{RF2} \cos\omega_{IF2}t$$

where $\omega_{IF2}=\omega_{LO}-\omega_{RF2}$.

Next, the quadrature component and the in-phase component of the satellite signal are bandpass filtered to obtain another satellite baseband signal (step S355). More specifically, in this step, the bandpass filter (BPF) 226 performs bandpass filtering on the quadrature component (i.e., the mixed signal SG) and the in-phase component (i.e., the mixed signal SC) of the satellite signal to obtain the satellite baseband signal SL (i.e., bandpass-filtered signal). The bandpass filtering filters out the high frequency components $(\cos(\omega_{LO}+\omega_{RF1})t$, $\cos(\omega_{LO}+\omega_{RF2})t$ and $\cos(\omega_{LO}+\omega_{RF3})t)$ and the low frequency components $(\cos(\omega_{LO}-\omega_{RF1})t$ and $\cos(\omega_{LO}-\omega_{RF2})t)$. The in-phase component (SL_I) and the quadrature component (SL_Q) of the satellite baseband signal SL can be expressed by expressions (14) and (15), respectively:

$$SL\_I = G_1\left[\frac{A_{RF3}}{2}\cos(\omega_{LO}-\omega_{RF3})t + j \cdot \frac{A_{RF3}}{2}\sin(\omega_{LO}-\omega_{RF3})t\right] \quad (14)$$

-continued $$SL\_Q = G_1\left[\frac{A_{RF3}}{2}\cos(\omega_{LO} - \omega_{RF3})t - j \cdot \frac{A_{RF3}}{2}\sin(\omega_{LO} - \omega_{RF3})t\right] \quad (15)$$

Thus, the satellite baseband signal SL can be expressed by expression (16):

$$SL = SL\_I + SL\_Q \quad (16)$$
$$= G_1 \cdot A_{RF3} \cos(\omega_{LO} - \omega_{RF3})t$$
$$= G_1 \cdot A_{RF3} \cos \omega_{IF3} t$$

where $\omega_{IF3} = \omega_{LO} - \omega_{RF3}$. The bandpass filter 226 can be implemented, for example, by an image rejection bandpass filter. The satellite baseband signal SL is amplified by the amplifier 227 (e.g., a PGA having a gain of $G_2$) (step S360) and thus becomes an amplified satellite baseband signal SM, which can be expressed by expression (17):

$$SM = G_1 \cdot G_2 \cdot A_{RF3} \cos \omega_{IF3} t \quad (17)$$

Then, the analog-to-digital converters (ADC) 224, 225 and 228 respectively convert the satellite baseband signal SF, the satellite baseband signal SK, and the amplified satellite baseband signal SM into the digital domain (step S365). In the digital domain, the digital signal processor (DSP) 229 amplifies these three satellite baseband signals again with a coding gain (step S370) and then generates location information according to these three satellite baseband signals.

In summary, when the frequency $f_{LO}$ of the first reference signal SO is set to be between the center frequency of the frequency band 120 (or 130) and the center frequency of the frequency band 110 (i.e., $\omega_{RF2} < \omega_{LO} < \omega_{RF1}$), the satellite baseband signal SF corresponds to the satellite signal of the GLONASS, the satellite baseband signal SK corresponds to the satellite signal of the Galileo system or the GPS, and the satellite baseband signal SL and the amplified satellite baseband signal SM correspond to the satellite signals of the BDS. In a preferred embodiment, when the frequency $f_{LO}$ is set to be $$\frac{\omega_{RF2}}{2\pi} < f_{LO} < \frac{\omega_{RF1}}{2\pi},$$

$f_{LO}$ may be set to be equal to half the sum of the substantially lowest frequency of the frequency band 120 (or 130) and the substantially highest frequency of the frequency band 110. Take the frequency band 120 as an example, $f_{LO} \cong (1573.374+1605.375)/2$.

In other embodiments, when the frequency $f_{LO}$ of the first reference signal SO is set to be between the center frequency of the frequency band 120 (or 130) and the center frequency of the frequency band 140 (i.e., $\omega_{RF3} < \omega_{LO} < \omega_{RF2}$), the satellite signal of the Galileo system (or the GPS) and the satellite signal of the BDS are each other's mirror signals; in this case, the satellite baseband signal SF corresponds to the satellite signal of the Galileo system or the GPS, the satellite baseband signal SK corresponds to the satellite signal of the BDS, and the satellite baseband signal SL and the amplified satellite baseband signal SM correspond to the satellite signals of the GLONASS. In a preferred embodiment, when the frequency $f_{LO}$ is set to be $$\frac{\omega_{RF3}}{2\pi} < f_{LO} < \frac{\omega_{RF2}}{2\pi},$$

$f_{LO}$ may be set to be equal to half the sum of the substantially highest frequency of the frequency band 120 (or 130) and the substantially lowest frequency of the frequency band 140. Take the frequency band 120 as an example, $f_{LO} \cong (1577.466+1559.052)/2$.

Figure 4:
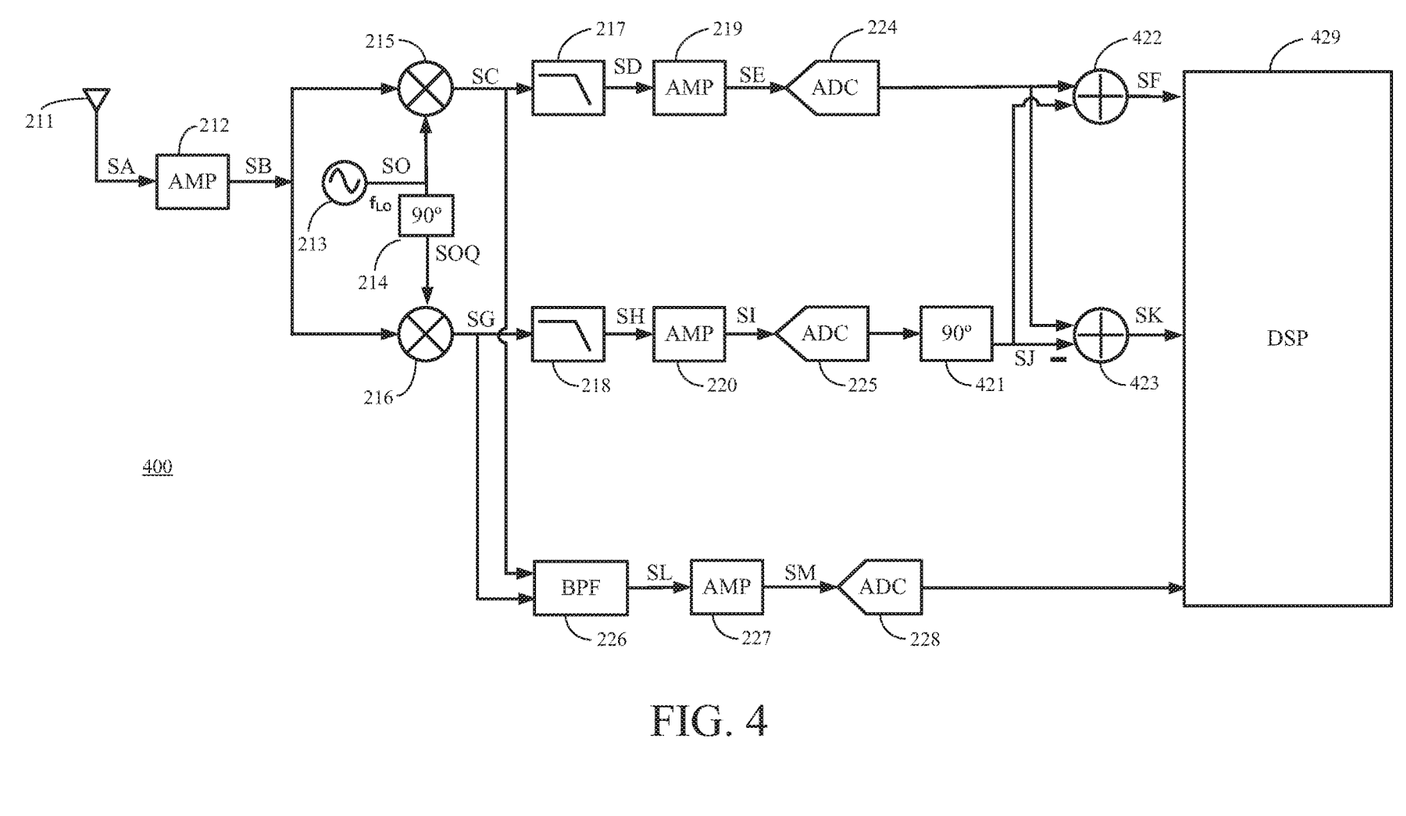
FIG. 4 illustrates a functional block diagram of a satellite signal receiving circuit according to another embodiment of the present invention.

In the embodiment illustrated in FIGS. 3A and 3B, the order of certain steps can be changed without affecting the implementation of the present invention. For example, step S330 can be performed before step S327; step S355 can be performed before steps S345 and S350. In different embodiments, steps S340, S345, and S350 of FIG. 3B may also be performed in the digital domain, that is, steps S340, S345, and S350 may also be performed after step S365, and the corresponding circuit diagram is shown in FIG. 4. The satellite signal receiving circuit 400 utilizes the IF 90° phase shifter 421, the phase operation circuit 422, and the phase operation circuit 423 to perform steps S340, S345, and S350 in the digital domain In some embodiments, the functions of the IF 90° phase shifter 421, the phase operation circuit 422, and the phase operation circuit 423 can also be implemented by the DSP 429, that is, the steps S340, S345, and S350 are performed by the corresponding modules in the DSP 429. These modules can be implemented by hardware (e.g., circuits) or by a control circuit of the DSP 429 (e.g., a microcontroller, a microprocessor, etc.) executing program codes or program instructions.

In summary, the present invention implements triple band reception of satellite signals, that is, the satellite signal receiving circuit and the satellite signal receiving method of the present invention can simultaneously receive satellite signals of three different center frequencies. Although the forgoing embodiments are exemplified by the GNSS, the present invention can also be applied to other systems.

Since a person having ordinary skill in the art can appreciate the implementation detail and the modification thereto of the present method invention through the disclosure of the device invention, repeated and redundant description is thus omitted. Please note that there is no step sequence limitation for the method inventions as long as the execution of each step is applicable. Furthermore, the shape, size, and ratio of any element and the step sequence of any flow chart in the disclosed figures are exemplary for understanding, not for limiting the scope of this invention.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:
1. A satellite signal receiving circuit configured to receive a satellite signal, comprising:
   an oscillator configured to generate a first reference signal;
   a first mixer coupled to the oscillator and configured to mix the first reference signal with the satellite signal to generate a first mixed signal;
   a first phase shifter coupled to the oscillator and configured to adjust a phase of the first reference signal to generate a second reference signal, wherein the first reference signal and the second reference signal are in quadrature;

a second mixer coupled to the first phase shifter and configured to mix the second reference signal with the satellite signal to generate a second mixed signal;

a first low-pass filter coupled to the first mixer and configured to filter the first mixed signal to obtain a first filtered signal;

a second low-pass filter coupled to the second mixer and configured to filter the second mixed signal to obtain a second filtered signal;

a second phase shifter coupled to the second low-pass filter and configured to adjust a phase of the second filtered signal to generate a phase-shifted signal;

a first phase operation circuit coupled to the first low-pass filter and the second phase shifter and configured to perform operations on the first filtered signal and the phase-shifted signal to generate a first satellite baseband signal;

a second phase operation circuit coupled to the first low-pass filter and the second phase shifter and configured to perform operations on the first filtered signal and the phase-shifted signal to generate a second satellite baseband signal; and a bandpass filter coupled to the first mixer and the second mixer and configured to filter the first mixed signal and the second mixed signal to obtain a third satellite baseband signal.

2. The satellite signal receiving circuit of claim 1 further comprising:

a first analog-to-digital converter (ADC) coupled to the first phase operation circuit and configured to convert the first satellite baseband signal into a digital domain;

a second ADC coupled to the second phase operation circuit and configured to convert the second satellite baseband signal into the digital domain;

a third ADC coupled to the bandpass filter and configured to convert the third satellite baseband signal into the digital domain; and a digital signal processor coupled to the first ADC, the second ADC, and the third ADC and configured to amplify the first satellite baseband signal, the second satellite baseband signal, and the third satellite baseband signal with a coding gain.

3. The satellite signal receiving circuit of claim 1 further comprising:

a first analog-to-digital converter (ADC) coupled between the first low-pass filter and the first phase operation circuit and configured to convert the first filtered signal into a digital domain;

a second ADC coupled between the second low-pass filter and the second phase shifter and configured to convert the second filtered signal into the digital domain;

a third ADC coupled to the bandpass filter and configured to convert the third satellite baseband signal into the digital domain; and a digital signal processor coupled to the first phase operation circuit, the second phase operation circuit, and the third ADC and configured to amplify the first satellite baseband signal, the second satellite baseband signal, and the third satellite baseband signal with a coding gain;

wherein the second phase shifter, the first phase operation circuit, and the second phase operation circuit perform operations in the digital domain.

4. The satellite signal receiving circuit of claim 1, wherein the first satellite baseband signal corresponds to the Global Orbiting Navigation Satellite System (GLONASS), the second satellite baseband signal corresponds to the Global Positioning System (GPS) or the Galileo system, the third satellite baseband signal corresponds to the BeiDou Navigation Satellite System (BDS), and the frequency of the first reference signal is between 1575.42 MHz and 1602 MHz.

5. The satellite signal receiving circuit of claim 4, wherein the frequency of the first reference signal is substantially equal to half of a sum of the lowest frequency of the GPS or the Galileo system and the highest frequency of the GLONASS.

6. The satellite signal receiving circuit of claim 1, wherein the first satellite baseband signal corresponds to the Global Positioning System (GPS) or the Galileo system, the second satellite baseband signal corresponds to the BeiDou Navigation Satellite System (BDS), the third satellite baseband signal corresponds to the Global Orbiting Navigation Satellite System (GLONASS), and the frequency of the first reference signal is between 1575.42 MHz and 1561.098 MHz.

7. The satellite signal receiving circuit of claim 6, wherein the frequency of the first reference signal is substantially equal to half of a sum of the highest frequency of the GPS or the Galileo system and the lowest frequency of the BDS.

8. A satellite signal receiving method, comprising:

(a) receiving a satellite signal;

(b) providing a first reference signal;

(c) mixing the first reference signal and the satellite signal to obtain an in-phase component of the satellite signal;

(d) providing a second reference signal, wherein the first reference signal and the second reference signal are in quadrature;

(e) mixing the second reference signal and the satellite signal to obtain a quadrature component of the satellite signal;

(f) low-pass filtering the in-phase component of the satellite signal and the quadrature component of the satellite signal;

(g) phase-shifting the low-pass filtered quadrature component of the satellite signal to generate a phase-shifted quadrature component;

(h) calculating a sum of the phase-shifted quadrature component and the low-pass filtered in-phase component of the satellite signal to obtain a first satellite baseband signal;

(i) calculating a difference between the phase-shifted quadrature component and the low-pass filtered in-phase component of the satellite signal to obtain a second satellite baseband signal; and (j) bandpass filtering the in-phase component of the satellite signal and the quadrature component of the satellite signal to obtain a third satellite baseband signal.

9. The satellite signal receiving method of claim 8 further comprising:

(k) converting first satellite baseband signal, the second satellite baseband signal, and the third satellite baseband signal into a digital domain; and (l) amplifying the first satellite baseband signal, the second satellite baseband signal, and the third satellite baseband signal with a coding gain.

10. The satellite signal receiving method of claim 8 further comprising:

(k) converting the low-pass filtered in-phase component of the satellite signal into a digital domain;

(l) converting the low-pass filtered quadrature component of the satellite signal into the digital domain;

(m) converting the third satellite baseband signal into the digital domain; and (n) amplifying the first satellite baseband signal, the second satellite baseband signal, and the third satellite baseband signal with a coding gain;

wherein step (k) and step (l) are performed before step (g), step (h), and step (i).

11. The satellite signal receiving method of claim 8, wherein the first satellite baseband signal corresponds to the Global Orbiting Navigation Satellite System (GLONASS), the second satellite baseband signal corresponds to the Global Positioning System (GPS) or the Galileo system, the third satellite baseband signal corresponds to the BeiDou Navigation Satellite System (BDS), and the frequency of the first reference signal is between 1575.42 MHz and 1602 MHz.

12. The satellite signal receiving method of claim 11, wherein the frequency of the first reference signal is substantially equal to half of a sum of the lowest frequency of the GPS or the Galileo system and the highest frequency of the GLONASS.

13. The satellite signal receiving method of claim 8, wherein the first satellite baseband signal corresponds to the Global Positioning System (GPS) or the Galileo system, the second satellite baseband signal corresponds to the BeiDou Navigation Satellite System (BDS), the third satellite baseband signal corresponds to the Global Orbiting Navigation Satellite System (GLONASS), and the frequency of the first reference signal is between 1575.42 MHz and 1561.098 MHz.

14. The satellite signal receiving method of claim 13, wherein the frequency of the first reference signal is substantially equal to half of a sum of the highest frequency of the GPS or the Galileo system and the lowest frequency of the BDS.

\* \* \* \* \*